United States Patent
Cheng et al.

(10) Patent No.: US 7,308,052 B2
(45) Date of Patent: Dec. 11, 2007

(54) RADIO TRANSMITTER APPARATUS AND MODULATION SCHEME SELECTING METHOD

(75) Inventors: Jun Cheng, Soraku-gun (JP); Kenichi Miyoshi, Yokohama (JP)

(73) Assignee: Matsushita Electrical Industrial Co., Ltd., Osaka (JP)

(*) Notice: Subject to any disclaimer, the term of this patent is extended or adjusted under 35 U.S.C. 154(b) by 108 days.

(21) Appl. No.: 10/564,089

(22) PCT Filed: Jul. 30, 2004

(86) PCT No.: PCT/JP2004/011299

§ 371 (c)(1),
(2), (4) Date: Feb. 9, 2006

(87) PCT Pub. No.: WO2005/013525

PCT Pub. Date: Feb. 10, 2005

(65) Prior Publication Data

US 2006/0198450 A1    Sep. 7, 2006

(30) Foreign Application Priority Data

Jul. 31, 2003 (JP) .............................. 2003-284509

(51) Int. Cl.
*H03D 1/00* (2006.01)
*H04L 27/00* (2006.01)
*H04B 1/00* (2006.01)

(52) U.S. Cl. ...................... 375/340; 375/295; 375/260; 455/65

(58) Field of Classification Search .................. 455/23, 455/42, 65, 61, 102, 506, 295; 375/219, 375/260, 261–262, 295, 298, 299, 347, 340, 375/349, 278, 284; 370/338, 212–215, 483
See application file for complete search history.

(56) References Cited

U.S. PATENT DOCUMENTS 5,434,883 A * 7/1995 Kimoto et al. .............. 375/231

(Continued)

FOREIGN PATENT DOCUMENTS

JP         11275164         10/1999

(Continued)

OTHER PUBLICATIONS

PCT International Search Report dated Nov. 9, 2004.

(Continued)

*Primary Examiner*—Sonny Trinh
(74) *Attorney, Agent, or Firm*—Stevens, Davis, Miller & Mosher, LLP

(57) ABSTRACT

A wireless transmission apparatus that can accurately select an optimal modulation scheme on a per block basis in a multi-carrier communication system in which block division of subcarriers and adaptive modulation are performed. In this wireless transmission apparatus, a propagation path characteristics acquisition section (107) acquires the average SNR and SNR dispersion for each block, which are estimated by a wireless reception apparatus (200), using received signals inputted from a reception RF section (106) and outputs these to an assignment section (108), the assignment section (108) selects a modulation scheme for each block based on the average SNR and SNR dispersion of each block inputted from the propagation path characteristics acquisition section (107), and modulation sections (101-1, 101-2, . . . , 101-L) modulate multi-carrier signals included in each block, with the modulation scheme for each block selected by the assignment section (108).

8 Claims, 5 Drawing Sheets

U.S. PATENT DOCUMENTS

| | | | |
|---|---|---|---|
| 6,236,676 B1 * | 5/2001 | Shaffer et al. | 375/222 |
| 6,359,934 B1 * | 3/2002 | Yoshida | 375/262 |
| 6,628,667 B1 * | 9/2003 | Murai et al. | 370/468 |
| 6,738,646 B2 | 5/2004 | Miyoshi et al. | |
| 6,859,466 B1 * | 2/2005 | Chen et al. | 370/509 |
| 7,003,050 B2 * | 2/2006 | Matsumoto et al. | 375/295 |
| 7,136,427 B2 * | 11/2006 | Niida et al. | 375/299 |
| 7,215,927 B2 * | 5/2007 | Miyoshi | 455/45 |
| 2003/0060165 A1 | 3/2003 | Horisaki | |
| 2004/0037262 A1 | 2/2004 | Tanada | |
| 2004/0076172 A1 | 4/2004 | Sano | |
| 2004/0081260 A1 * | 4/2004 | Matsusaka | 375/340 |

FOREIGN PATENT DOCUMENTS

| | | |
|---|---|---|
| JP | 2001103032 | 4/2001 |
| JP | 2002101043 | 4/2002 |
| JP | 2002246958 | 8/2002 |
| JP | 2003069531 | 3/2003 |
| JP | 2003110517 | 4/2003 |
| JP | 2003169036 | 6/2003 |

OTHER PUBLICATIONS

H. Matsuoka, et al.; "An Analysis on the Performance of Variable Symbol Rate and Modulation Level Adaptive Modulation System," Technical Report of IEICE, RCS94-64, Sep. 1994, The Institute of Electronics Information and Communication Engineer, with English Abstract, pp. 31-36.

Y. Hara, et al.; "MC-CDM System for Packet Communications Using Frequency Scheduling," Technical Report of IEICE, NS2002-1001, RCS2002-129, Jul. 2002, The Institute of Electronics, Information and Communication Engineers, with English Abstract, pp. 61-66.

S. Muneta, et al.; "Performance of New Frequency-Domain Link Adaption Scheme for OFDM systems," Technical Report of IEICE, DSP99-166, SAT99-121, RCS99-171, Jan. 2000, The Institute of Electronics, Information and Communication Engineers, pp. 99-106.

* cited by examiner

| SUBCARRIER NUMBER | SNR | | |
|---|---|---|---|
| | CASE a | CASE b | CASE c |
| 1 | 2 | 1 | 4 |
| 2 | 3 | 2 | 3 |
| 3 | 2 | 3 | 2 |
| 4 | 3 | 4 | 1 |
| SNR DISPERSION | 0.25 | 1.25 | 1.25 |

| SUBCARRIER NUMBER | SNR | | |
|---|---|---|---|
| | CASE a | CASE b | CASE c |
| 1 | 2 | 1 | 4 |
| 2 | 3 | 2 | 3 |
| 3 | 2 | 3 | 2 |
| 4 | 3 | 4 | 1 |
| NORMALIZED SNR ERROR | 0.3 | 0.3 | 0.3 |

FIG.8

RADIO TRANSMITTER APPARATUS AND MODULATION SCHEME SELECTING METHOD

TECHNICAL FIELD

The present invention relates to a wireless transmission apparatus and a modulation scheme selection method.

BACKGROUND ART

In a communication system in which adaptive modulation is performed, an optimal modulation scheme is selected based on propagation path characteristics that change with time. High-speed data communication can be performed by selecting the fastest modulation scheme that can satisfy the desired error rate (e.g., Packet Error Rate: PER=1%) based on propagation path characteristics. For example, when adaptive modulation is applied to downlink channels, the propagation path characteristics measured by a mobile station at the data receiving end are reported to a base station at the data transmitting end, and then the base station selects an optimal modulation scheme for the reported current propagation path characteristics and transmits data to the mobile station.

In the communication system in which such adaptive modulation is performed, the average signal to noise ratio (SNR) measured at the data receiving end is most commonly used as the value representing propagation path characteristics. Furthermore, in order to improve the accuracy of modulation scheme selection, a method of selecting a modulation scheme is also proposed taking into account delay spread as well as average SNR (for example, see H. Matsuoka, T. Ue, S. Sampei and N. Morinaga, "An Analysis on the Performance of Variable Symbol Rate and Modulation Level Adaptive Modulation System", TECHNICAL REPORT OF IEICE, RCS 94-64 (1994-09), pp. 31-36: hereinafter referred to as "reference 1"). In addition, in multi-carrier communication system such as orthogonal frequency division multiplexing (OFDM) system, a method of selecting a modulation scheme is also proposed based on average SNR and variation in propagation path characteristics between adjacent subcarriers (for example, see Unexamined Japanese Patent Publication No. 2001-103032: hereinafter referred to as "reference 2").

Now, when adaptive modulation is applied to a multi-carrier communication system, adaptive modulation is implemented per subcarrier. Therefore, at the data receiving end, it is necessary to report to the data transmitting end the value representing propagation path characteristics per subcarrier.

For example, in a mobile communications system in which frequency scheduling is performed such that the base station assigns to a plurality of mobile stations different subcarriers based on the propagation path characteristics of the downlink channel of each subcarrier, all of the plurality of mobile stations report to the base station the propagation path characteristics per subcarrier, and the volume of traffic increase on uplink channels. In order to solve this problem, it has been proposed to divide a plurality of subcarriers is into a number of blocks (i.e., block division of subcarriers) and carry our frequency scheduling on a per block basis. According to this method, since each mobile station has only to report propagation path characteristics on a per block basis, the volume of traffic on uplink channels can be reduced considerably compared with the case where propagation path characteristics are reported on a per subcarrier basis. If adaptive modulation is applied to a communication system in which such block division of subcarriers is carried out, all subcarriers belonging to the same block are modulated with the same modulation scheme.

However, in the above-noted prior art examples, if adaptive modulation is performed in a communication system where block division of subcarriers is carried out, there is a problem that the optimal modulation scheme cannot be accurately selected, for the following reasons.

For instance, since the delay spread in above reference 1 represents variations in propagation path characteristics over full bandwidth, it cannot represent the variation in narrowband propagation path characteristics of each block, when subcarriers are divided into blocks. Consequently, when subcarriers are divided into blocks, the optimal modulation scheme cannot be selected accurately.

One instance for estimating the variation in propagation path characteristics between adjacent subcarriers as in the above reference 2 based on SNR variation is shown in FIG. 8. Namely, in case a, the SNR value varies between 2 and 3 among four subcarriers in one block, and so the normalized SNR error representing the SNR variation between adjacent subcarriers is 0.3. On the other hand, in cases b and c, although the variation of SNR values among four subcarriers in one block is greater than in case a, the normalized SNR error is 0.3, which is the same as in case a. In this way, when subcarriers are divided into blocks, the variation in propagation path characteristics between adjacent subcarriers (i.e. normalized SNR error) sometimes have the same value both in case a where SNR variation is relatively small and in cases b and c where SNR variation is relatively large. Under such circumstances, the variation in propagation path characteristics with in each block cannot be estimated accurately, and the optimal modulation scheme cannot be selected accurately for cases a to c, when subcarriers are divided into blocks.

As mentioned above, when bock division of subcarriers is carried out, it is difficult to accurately select the optimal modulation by the method of reference 1 or reference 2 in cases where subcarriers are divided into blocks. Therefore, to perform adaptive modulation in communication systems in which block division of subcarriers is carried out, it is necessary to introduce new parameters that optimally represent variations in narrowband propagation path characteristics of each block.

DISCLOSURE OF INVENTION

It is therefore an object of the present invention to provide a wireless transmission apparatus and a modulation scheme selection method that can accurately select the optimal modulation scheme on a per block basis in a multi-carrier communication system where block division of subcarriers and adaptive modulation are performed.

To achieve the above object, with the present invention, "dispersion" refers to values that represent variations in propagation path characteristics of each block in a multi-carrier communication system where block division of subcarriers and adaptive modulation are performed.

A wireless transmission apparatus according to the present invention performs adaptive modulation with a multicarrier signal formed with a plurality of blocks, each block including a plurality of subcarrier signals, the wireless transmission apparatus comprising, and this wireless transmission apparatus employs a configuration having: a selection section that selects modulation schemes of the plurality of blocks on a per block basis; and a modulation section that modulates the plurality of subcarrier signals in the plurality of blocks using the modulation schemes selected on a per block basis, and the selection section selects the modulation schemes on a per block basis based on an average and a dispersion of values representing propagation path characteristics of each block.

With this configuration, variations in propagation path characteristics of each block are represented accurately by dispersion of values representing propagation path characteristics, so that the optimal modulation scheme can be accurately selected on a per block basis in a multi-carrier communication system in which block division of subcarriers and adaptive modulation are performed.

BRIEF DESCRIPTION OF DRAWINGS

FIG. 8. is a diagram for explaining parameters representing conversional dispersion of propagation path characteristics (normalized SNR errors).

BEST MODE FOR CARRYING OUT THE INVENTION

Now, embodiments of the present invention will be explained below in detail with reference to the accompanying drawings.

Embodiment 1

A case will be described with this embodiment where SNR dispersion is used as a value representing variations in propagation path characteristics in each block.

Figure 1:
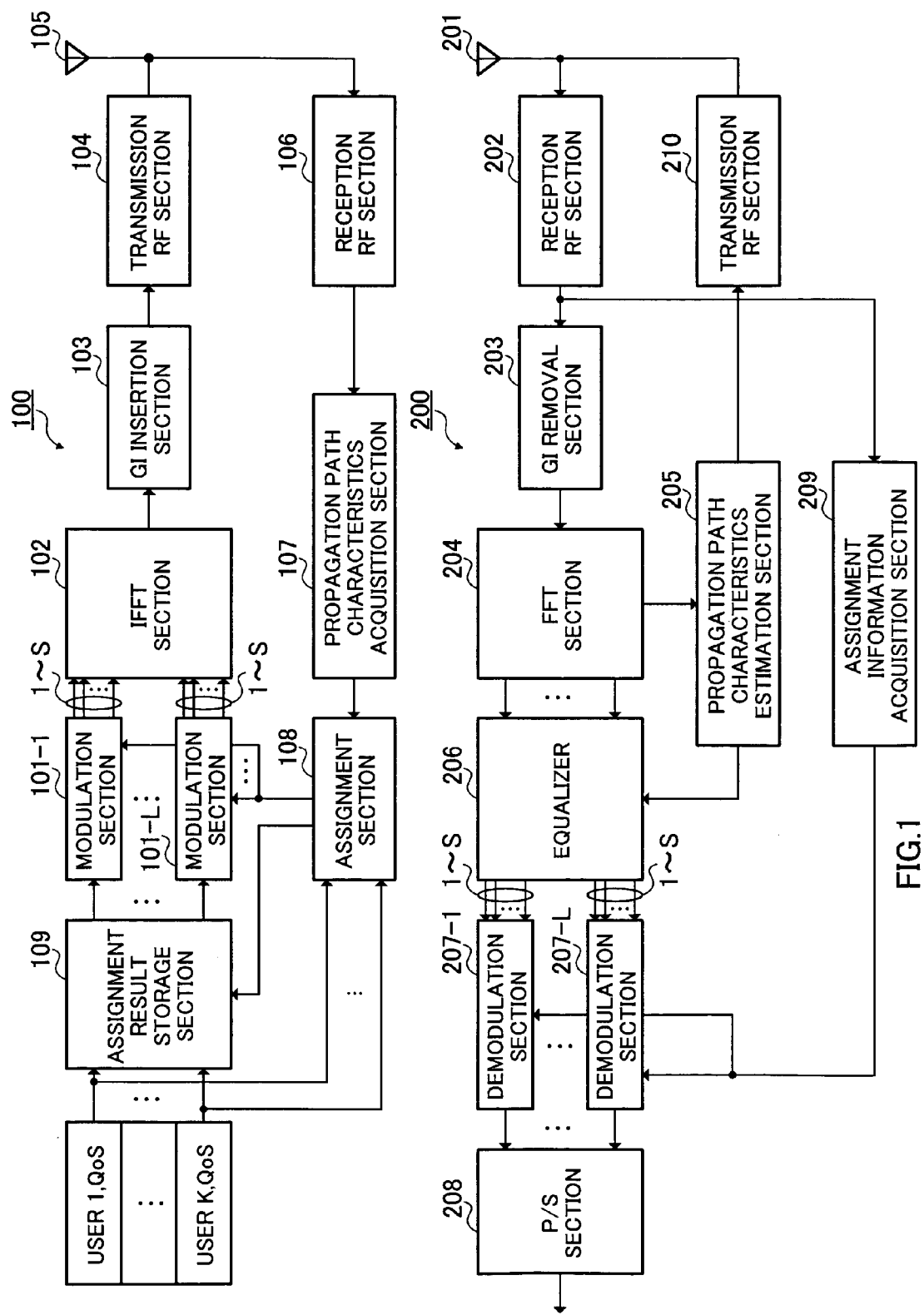
FIG. 1 is a block diagram showing a configuration of a wireless transmission apparatus and a wireless reception apparatus according to Embodiment 1 of the present invention.

FIG. 1 is a block diagram showing a configuration of a wireless transmission apparatus and a wireless reception apparatus according to Embodiment 1 of the present invention.

In the following, an OFDM system will be used as a multi-carrier communication system.

A wireless transmission apparatus 100 shown in FIG. 1 mainly comprises: modulation sections 101-1, 101-2, ..., 101-L; inverse fast Fourier transform (IFFT) section 102; guard interval (GI) insertion section 103; transmission RF section 104; transmitting and receiving antenna 105; reception RF section 106, propagation path characteristics acquisition section 107; assignment section 108; and assignment result storage section 109. This wireless transmission apparatus 100 is mounted, for example, in a base station in an OFDM system.

Also, wireless reception apparatus 200 shown in FIG. 1 mainly comprises: transmitting and receiving antenna 201; reception RF section 202; guard interval (GI) removal section 203, fast Fourier transform (FFT) section 204; propagation path characteristics estimation section 205; equalizer 206; demodulation sections 207-1, 207-2, ..., 207-L; parallel/serial conversion (P/S) section 208; assignment information acquisition section 209; and transmission RF section 210. This wireless reception apparatus 200 is mounted, for example, in the mobile station of any of users 1 to K in the OFDM system.

The modulation sections 101-1, 101-2, ..., 101-L modulate signals of users 1, 2, ..., K inputted via the assignment result storage section 109, applying different modulation schemes (64 QAM, 16 QAM, QPSK, and BPSK) to each of blocks 1-L based on the block assignment results of users 1 to K stored in the assignment result storage section 109 and modulation scheme information inputted from the assignment section 108. Also, the modulation scheme of each block is selected by the assignment section 108, according to the propagation path characteristics of each block estimated by the wireless reception apparatus 200. Here, the number of subcarriers contained in one OFDM signal is N, and these N subcarriers are divided into L blocks in increments of S subcarriers. Therefore, the number of blocks L is given by: L=N/S. Then all subcarrier signals 1-S belonging to each block are modulated with the same modulation scheme on a per block basis. For example, the modulation section 101-1 modulates all subcarrier signals belonging to block 1 with 64 QAM when the propagation path characteristics for block 1 are estimated to be good, and modulates all subcarrier signals belonging to block 1 with BPSK when the propagation path characteristics for block 1 are estimated to be poor. When the propagation path characteristics for block 1 are estimated to be extremely poor, the wireless transmission apparatus 100 may not transmit all subcarrier signals belonging to block 1. The signals modulated in this way are outputted to the IFFT section 102.

The IFFT section 102 performs an inverse fast Fourier transform with each modulated signal inputted from the modulation sections 101-1-101-L to generate an OFDM signal (time waveform signal), and outputs the OFDM signal to the GI insertion section 103.

The GI insertion section 103 inserts a guard interval for improving delay characteristics in the OFDM signal inputted from the IFFT section 102, and outputs the result to the transmission RF section 104.

The transmission RF section 104 up-converts the OFDM signal inputted from the GI insertion section 103 to RF band, and transmits it to the wireless reception apparatuses 200 of users 1 to K from the transmitting and receiving antenna 105.

The reception RF section 106 receives signals transmitted from the wireless reception apparatuses 200 of users 1 to K, from the transmitting and receiving antenna 105, downconverts these signals from RF band, and output the results to the propagation path characteristics acquisition section 107.

The propagation path characteristics acquisition section 107 acquires the propagation path characteristics information with respect to each block estimated by the wireless reception apparatuses 200 of users 1 to K, from the received signals inputted from the reception RF section 106, and outputs them to the assignment section 108.

The assignment section 108 assigns blocks to users 1 to K and selects a modulation scheme on a per block basis, based on the propagation path characteristics information with respect to each block inputted from the propagation path characteristics acquisition section 107, stores the block assignment results in the assignment result storage section 109, and outputs modulation scheme information representing the selected modulation schemes to the modulation sections 101-1, 101-2, . . . , 101-L. The assignment section 108 may perform the block assignment and modulation scheme selection, taking into consideration also QoS (Quality of Service: for example, each user's required data transmission rate and/or required error rate) set for each of users 1 to K.

The assignment result storage section 109 stores the block assignment results for users 1 to K inputted from the assignment section 108.

In addition, information that indicates which block is modulated with which modulation scheme and which user's signal is assigned to which block of subcarriers (modulation scheme assignment information) is included in the OFDM signal and the OFDM signal is transmitted to the wireless reception apparatus 200.

Next, the configuration of the wireless reception apparatus 200 will be explained. Now, in the following explanation, the wireless reception apparatus will assumed to be that of user 1 of users 1 to K.

The reception RF section 202 receives the OFDM signal via the transmitting and receiving antenna 201, and outputs the OFDM signal to the GI removal section 203 and the assignment information acquisition section 209.

The GI removal section 203 removes the guard interval from the OFDM signal inputted from the reception RF section 202, and outputs the OFDM signal to the FFT section 204.

The FFT section 204 carries out the fast Fourier transform (FFT) of the OFDM signal after the guard interval removal inputted from the GI removal section 203 and transforms the OFDM signal to a signal of the frequency domain from a signal of the time domain. By this FFT, signals transmitted by a plurality of subcarriers are taken out and outputted to the equalizer 206 and the propagation path characteristics estimation section 205.

The propagation path characteristics estimation section 205 estimates the propagation path characteristics of each signal inputted from the FFT section 204, and outputs information (propagation path characteristics information) representing the propagation path characteristics to the equalizer 206 and the transmission RF section 210. More specifically, the propagation path characteristics estimation section 205 outputs the information representing the propagation path characteristics estimated per subcarrier to the equalizer 206, and outputs information representing the average and the dispersion in the propagation path characteristics estimated per block to the transmission RF section 210.

The equalizer 206 corrects the amplitude and phase distortion components in each signal inputted from the FFT section 204, based on the propagation path characteristics information inputted from the propagation path characteristics estimation section 205, and outputs the corrected signal to the demodulation sections 207-1, 207-2, . . . , 207-L.

The demodulation sections 207-1, 207-2, . . . , 207-L have demodulation functions corresponding respectively to modulation sections 101-1, 101-2, . . . , 101-L, and determine the demodulation scheme for each block based on the modulation scheme assignment information inputted from the assignment information acquisition section 209, demodulate the signals inputted from the equalizer 206 on a per block basis, and output the data after the demodulation to the P/S section 208 in parallel. At this time, the demodulation sections 207-1, 207-2, . . . , 207-L demodulate only the blocks including subcarrier signals for user 1 based on the modulation scheme assignment information.

The P/S section 208 converts the parallel data inputted from the demodulation sections 207-1, 207-2, . . . , 207-L into serial data, and then outputs the data as user 1's desired received data.

The assignment information acquisition section 209 acquires the modulation scheme assignment information from the OFDM signal inputted from the reception RF section 202, and outputs the information to the demodulation sections 207-1, 207-2, . . . , 207-L.

The transmission RF section 210 transmits the propagation path characteristics information inputted from the propagation path characteristics estimation section 205 to the wireless transmission apparatus 100 from the transmitting and receiving antenna 201.

Figures 2, 3:
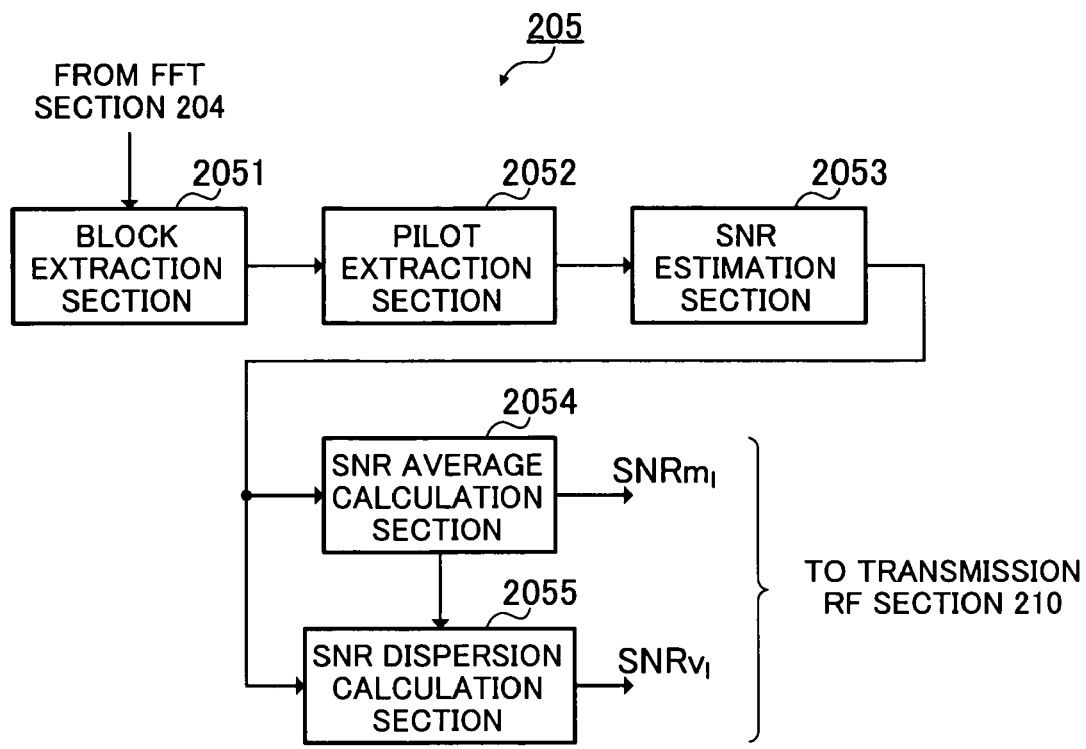
FIG. 2 is a block diagram showing a configuration of a propagation path characteristics estimation section in the wireless reception apparatus according to Embodiment 1 of the present invention.
FIG. 3 is a diagram for explaining SNR dispersion determined by the propagation path characteristics estimation section in the wireless reception apparatus according to Embodiment 1 of the present invention.

Next, the propagation path characteristics estimation section 205 in the wireless reception apparatus 200 having the above-described configuration will be explained. FIG. 2 is a block diagram showing a configuration of the propagation path characteristics estimation section 205.

A block extraction section 2051 extracts the subcarrier signals inputted from the FFT section 204 per block 1 to L, and outputs the signals to a pilot extraction section 2052.

Of the data and pilot assigned to each subcarrier, the pilot extraction section 2052 extracts only the pilot portion alone per block 1 to L, and outputs the pilot portion to an SNR estimation section 2053.

The SNR estimation section 2053 estimates the SNR (instantaneous SNR) each of pilot portion per block 1 to L, and outputs the results to a SNR average calculation section 2054 and a SNR dispersion calculation section 2055. The SNR estimation section 2053 estimates the instantaneous SNR as follows.

First, the SNR estimation section 2053 calculates the channel estimation value: h, according to Equation (1).

In Equation (1), $h_l(s,i)$ is the channel estimation value corresponding to the ith pilot portion on the time-axis of the sth subcarrier in the lth block, and $y_l(s,i)$ and $d_l(s,i)$ is the received signal and the corresponding known pilot symbol of the lth pilot portion on the time-axis of the sth subcarrier in the lth block, respectively. In addition, "*" is the complex conjugate.

$$h_l(s, i) = \frac{y_l(s, i)}{d_l(s, i)} = \frac{y_l(s, i) \cdot d_l^*(s, i)}{|d_l(s, i)|^2} \quad (1)$$

where l is 1 =1, 2, . . . , N/S, and s=1, 2, . . . , S;

N is the total number of all subcarriers in the received OFDM signal; and

S is the number of subcarriers contained in a one block.

Next, instantaneous SNR: g is calculated according to Equation (2). In Equation (2), $g_l(s,i)$ is the instantaneous SNR corresponding to the ith pilot portion on the time-axis of the sth subcarrier in the lth block, $P_0$ is the transmitted signal power for each subcarrier, and $N_0$ is the noise power for each subcarrier.

$$g_l(s, i) = \frac{P_0}{N_0} h_l(s, i) \quad (2)$$

The SNR average calculation section 2054 averages a plurality of instantaneous SNRs per block 1 to L according to Equation (3), determine the average SNR ($SNRm_l$), and outputs these average SNR to the SNR dispersion calculation section 2055. Also, the SNR average calculation section 2054 outputs the average SNR ($SNRm_l$) as propagation path characteristics information to the transmission RF section 210. Here, $SNRm_l$ is the average SNR of the lth block, and I is the number of pilot symbols in each subcarrier on the time-axis.

$$SNRm_l = \frac{1}{SI} \sum_{s=1}^{S} \sum_{i=1}^{I} g_l(s, i) \quad (3)$$

SNR dispersion calculation section 2055 calculates SNR dispersion: $SNRv_l$ per block 1 to L, according to Equation (4), and outputs $SNRv_l$ as propagation path characteristics information, to the transmission RF section 210. Here, $SNRv_l$ is SNR dispersion with the lth block.

$$SNR_{v_l} = \frac{1}{SI} \sum_{s=1}^{S} \sum_{i=1}^{I} (g_l(s, i) - SNR_m)^2 \quad (4)$$

Here, FIG. 3 shows the SNR dispersion calculated according to Equation (4) in the same cases a through c as shown in FIG. 8 mentioned above. For example, in case a, S=4 (the number of subcarriers contained in one block), I=1 (assuming that one pilot symbol is assigned to each subcarrier), and g=2, 3, 2, 3 (the instantaneous SNR of the subcarriers), and Equations (3) and (4) give SNRm (average SNR)=2.5 and SNRv (SNR dispersion)=0.25. Similarly, in case b and case c, Equations (3) and (4) give SNRm (average SNR)=2.5 and SNRv (SNR dispersion)=1.25, respectively. That is, in case a where SNR variation is relatively small, the SNR dispersion is small, while in case b and case c where SNR variation is relatively large, the SNR dispersion is large. From this result, it is understood that the variation in propagation path characteristics in each block can be estimated accurately by using SNR dispersion as a parameter for estimating the variation in propagation path characteristics in each block. Therefore, at the wireless transmission apparatus 100, the optimal modulation scheme to each of cases a through c can be selected accurately, when block division of subcarriers is carried out.

Next, the modulation scheme selection performed by the assignment section 108 in the wireless transmission apparatus 100 having the above-described configuration will be explained. Here, one modulation scheme is selected from 64 QAM, 16 QAM, QPSK and BPSK according to the following selection method 1 or 2.

<Selection Method 1>

Figure 4:
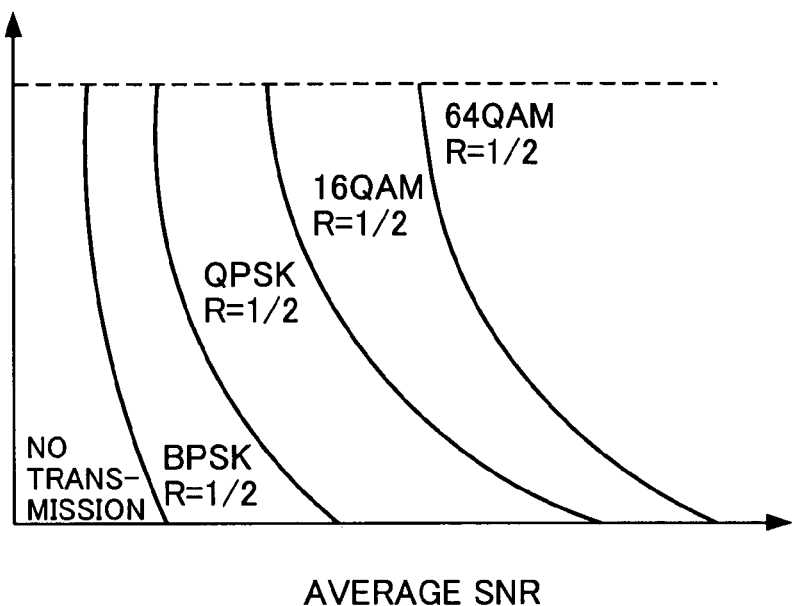
FIG. 4 is a diagram for explaining modulation scheme selection (selection method 1) performed by an assignment section in the wireless transmission apparatus according to Embodiment 1 of the present invention.

The assignment section 108 selects the modulation scheme of the best transmission efficiency, based on the propagation path characteristics information, i.e. SNRm, (average SNR) and SNRv (SNR dispersion), inputted from the propagation path characteristics acquisition section 107. The correspondence among SNRm (average SNR), SNRv (SNR dispersion) and modulation scheme at predetermined PER (for example, PER=$10^{-1}$) is shown in FIG. 4. In FIG. 4, a given 2-dimensional coordinate space is divided in advance by reciprocal function of SNR dispersion and average SNR in five areas, and a modulation scheme (including "no transmission") is assigned to each area. So, the estimated propagation path characteristics are represented by coordinates (SNRm, 1/SNRv), and the modulation scheme and the coding rate corresponding to the area in which the coordinates are located are selected.

<Selection Method 2>

As weighted (weighted in dB value) SNR, the following four are defined.

$$SNRw1 = SNRm - sqrt(SNRv)*w \quad (1)$$

$$SNRw2 = SNRm - sqrt(SNRv)*w(|SNRm_{max} - SNRm|/|SNRm^{max}|) \quad (2)$$

$$SNRw3 = SNRm - sqrt(SNRv)*w(fd/fd_{max}) \quad (3)$$

$$SNRw4 = SNRm - sqrt(SNRv)*w(\sigma/\sigma_{max}) \quad (4)$$

Here, $SNRm_{max}$, $fd_{max}$, and $\sigma_{max}$ are the maximum average SNR, the maximum possible Doppler frequency, and the maximum possible delay spread, respectively. Sqrt(SNRv) represents the square root of SNRv. In addition, weighting factor w is a constant for SNRw1, a function of the normalized average SNR for SNRw2, a function of the normalized Doppler frequency fd for SNRw3, and a function of the normalized delay spread a for SNRw4. For example, weighting factor w takes values given by Equation (5).

$$w(x) = \begin{cases} x^2, & 0 \leq x \leq 1 \\ 1, & x > 1 \end{cases} \quad (5)$$

Figure 5:
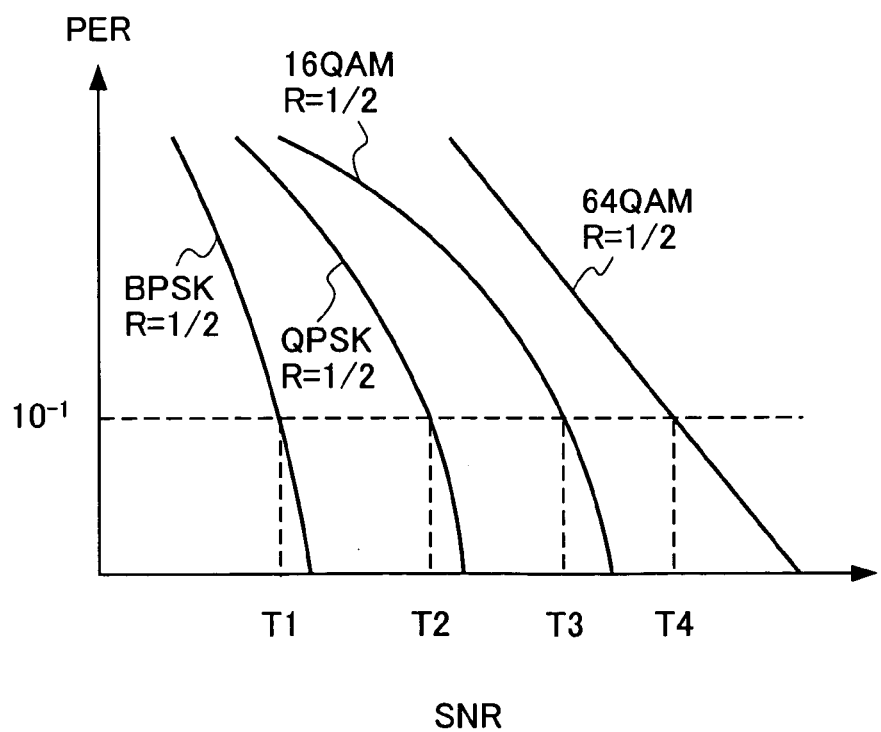
FIG. 5 is a diagram for explaining modulation scheme selection (selection method 2) performed by an assignment section in the wireless transmission apparatus according to Embodiment 1 of the present invention.

Then, the modulation scheme and the coding rate are selected as follows from the PER-SNR static characteristics as shown in FIG. 5. First, using the static characteristics shown in FIG. 5, the threshold value (T1-T4) for each modulation scheme is determined in correspondence with the required PER ($10^{-1}$ in FIG. 5). Next, SNRw3 is calculated for a specific Doppler frequency fd. If SNRw3>=T4, 64 QAM (coding rate R=½); if T3<=SNRw3<T4, 16 QAM (R=½); if T2<=SNRw3<T3, QPSK (R=½); and if T1<=SNRw3<T2, BPSK (R=½) is selected.

Alternatively, SNRw4 may be calculated for a specific delay spread σ. If SNRw4>=T4, 64 QAM (R=½); if T3<=SNRw4<T4, 16 QAM (R=½); if T2<=SNRw4<T3, QPSK (R=½); and if T1<=SNRw4<T2, BPSK (R=½) is selected. Alternatively, for SNRw1 and SNRw2, the modulation scheme and the coding rate may be selected from the PER-SNR characteristics shown in FIG. 5, as with SNRw3 and SNRw4.

In this way, with this embodiment, SNR dispersion is used as a parameter representing the variation in propagation path characteristics in each block in the communication system in which block division of subcarriers is carried out, so that the variation in propagation path characteristics in each block can be estimated accurately, and, as a result, the optimal modulation scheme can be accurately selected in adaptive modulation.

Additionally, although with this embodiment, the SNR dispersion is used as a parameter representing the variation in propagation path characteristics in each block, the following parameters can be obtained by modifying the Equation (4) defining SNR dispersion. Each parameter can be used as a parameter representing the variation in propagation path characteristics in each block, just as SNR dispersion.

Average change amount of instantaneous SNR $$u_l = \frac{1}{SI}\sum_{s=1}^{S}\sum_{i=1}^{I} |g_l(s, i) - SNRm_l|$$

Maximum change amount of instantaneous SNR $$v_l = \max_{\substack{1 \leq i \leq I \\ 1 \leq s \leq S}} |g_l(s, i) - SNRm_l|$$

Square of maximum change amount of instantaneous SNR $$x_l = \max_{\substack{1 \leq i \leq I \\ 1 \leq s \leq S}} |g_l(s, i) - SNRm_l|^2$$

Difference between maximum and minimum of instantaneous $$z_l = \frac{1}{2}\left|\max_{\substack{1 \leq i \leq I \\ 1 \leq s \leq S}} g_l(s, i) - \min_{\substack{1 \leq i \leq I \\ 1 \leq s \leq S}} g_l(s, i)\right|$$

Difference between square of maximum and square of minimum of instantaneous SNR $$d_l = \max_{\substack{1 \leq i \leq I \\ 1 \leq s \leq S}} |g_l(s, i)|^2 - \min_{\substack{1 \leq i \leq I \\ 1 \leq s \leq S}} |g_l(s, i)|^2$$

Embodiment 2

In this embodiment, the case where dispersion of channel estimation value is used as a value representing the variations of the propagation path characteristics in each block is explained.

Figure 6:
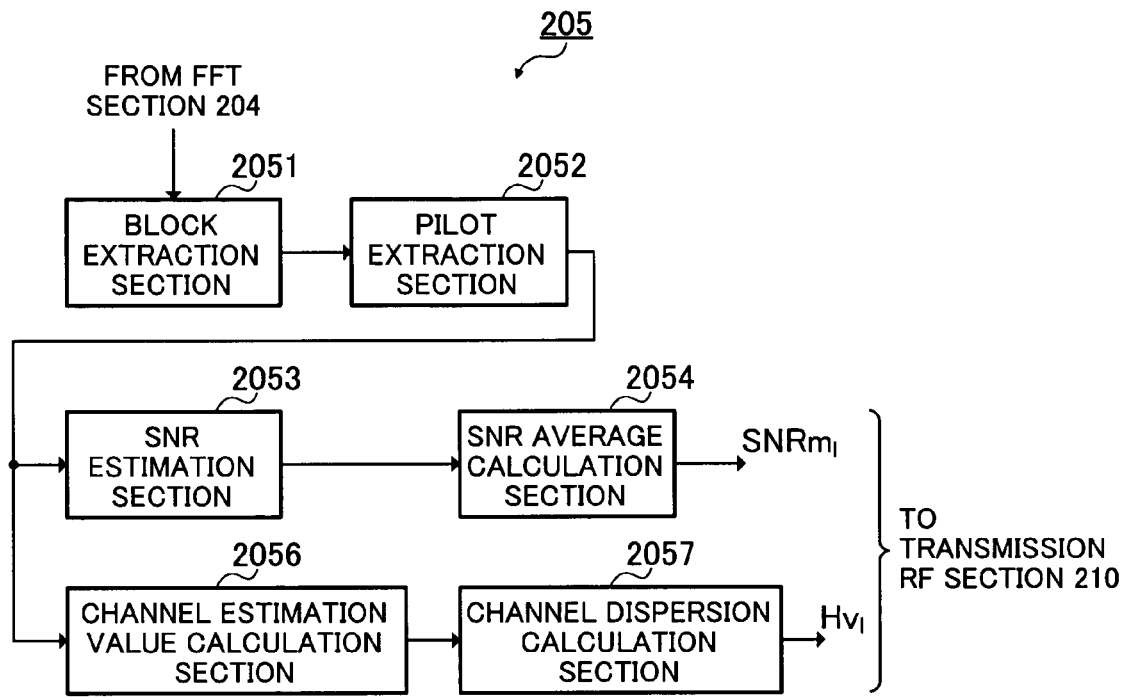
FIG. 6 is a block diagram showing a configuration of a propagation path characteristics estimation section in a wireless reception apparatus according to Embodiment 2 of the present invention.

FIG. 6 is a block diagram showing a configuration of a propagation path characteristics estimation section 205 according to Embodiment 2 of the present invention. In FIG. 6, the same portions as in FIG. 2 (in Embodiment 1) will be assigned the same reference numerals as in FIG. 2 to omit detailed explanations thereof.

The channel estimation value calculation section 2056 calculates channel estimation values from above Equation (1), and outputs these values to a channel dispersion calculation section 2057.

The channel dispersion calculation section 2057 calculates the dispersion of channel estimation values: $Hv_l$ per block 1 to L from Equation (6), and outputs the result to the transmission RF section 210 as propagation path characteristics information. Now, $Hv_l$ represents the dispersion of the channel estimation value of the lth block. Here, Equation (6) is derived, assuming that in Equation (2) mentioned above, $P_0$ and $N_0$ are constants for all subcarriers in a block.

$$Hv_l = \frac{1}{SI}\sum_{s=1}^{S}\sum_{i=1}^{I} (h_l(s, i) - Hm_l) \qquad (6)$$

$$\text{where, } Hm_l = \frac{1}{SI}\sum_{s=1}^{S}\sum_{i=1}^{I} h_l(s, i)$$

By using this channel estimation value dispersion as a parameter for estimating the variation in propagation path characteristics in each block, the variation in propagation path characteristics in each block can be estimated accurately as with Embodiment 1. Therefore, according to this embodiment, the optimal modulation scheme can be accurately selected, when adaptive modulation is performed in the communication system in which block division of subcarriers is carried out.

Also by using the dispersion of channel estimation value as a parameter for estimating the variation in the propagation path characteristics in each block, wireless transmission apparatus 100 can select modulation scheme with the same selection method as in Embodiment 1. In selection method 2, as weighted SNR, the following four are defined:

$$SNRw1 = SNRm - Hv*w \qquad (1)$$

$$SNRw2 = SNRm - Hv*w(|Hv_{max} - Hv|/Hv_{max}|) \qquad (2)$$

$$SNRw3 = SNRm - Hv*w(fd/fd_{max}) \qquad (3)$$

$$SNRw4 = SNRm - Hv*w(\sigma/\sigma_{max}) \qquad (4)$$

Additionally, with this embodiment, the dispersion of channel estimation values is used as a parameter representing the variation in the propagation path characteristics in each block, the following parameters can be obtained by modifying the Equation (6) defining the dispersion of channel estimation values. Each parameter can be used as a parameter representing the variation in the propagation path characteristics in each block, just as the dispersion of channel estimation values.

Average change amount of channel estimation values $$u_l = \frac{1}{SI}\sum_{s=1}^{S}\sum_{i=1}^{I} |h_l(s, i) - Hm_l|$$

Maximum change amount of channel estimation values $$v_l = \max_{\substack{1 \leq i \leq I \\ 1 \leq s \leq S}} |h_l(s, i) - Hm_l|$$

Square of maximum change amount of channel estimation values $$x_l = \max_{\substack{1 \le i \le I \\ 1 \le s \le S}} |h_l(s, i) - Hm_l|^2$$

Difference between maximum and minimum of channel estimation values $$z_l = \frac{1}{2}\left|\max_{\substack{1 \le i \le I \\ 1 \le s \le S}} h_l(s, i) - \min_{\substack{1 \le i \le I \\ 1 \le s \le S}} h_l(s, i)\right|$$

Difference between square of maximum and square of minimum of channel estimation values $$d_l = \max_{\substack{1 \le i \le I \\ 1 \le s \le S}} |h_l(s, i)|^2 - \min_{\substack{1 \le i \le I \\ 1 \le s \le S}} |h_l(s, i)|^2$$

Embodiment 3

A case will be described below with this embodiment where dispersion of amplitude values of signals of pilot portions (pilot dispersion) is used as a value representing the variation in propagation path characteristics of each block.

Figure 7:
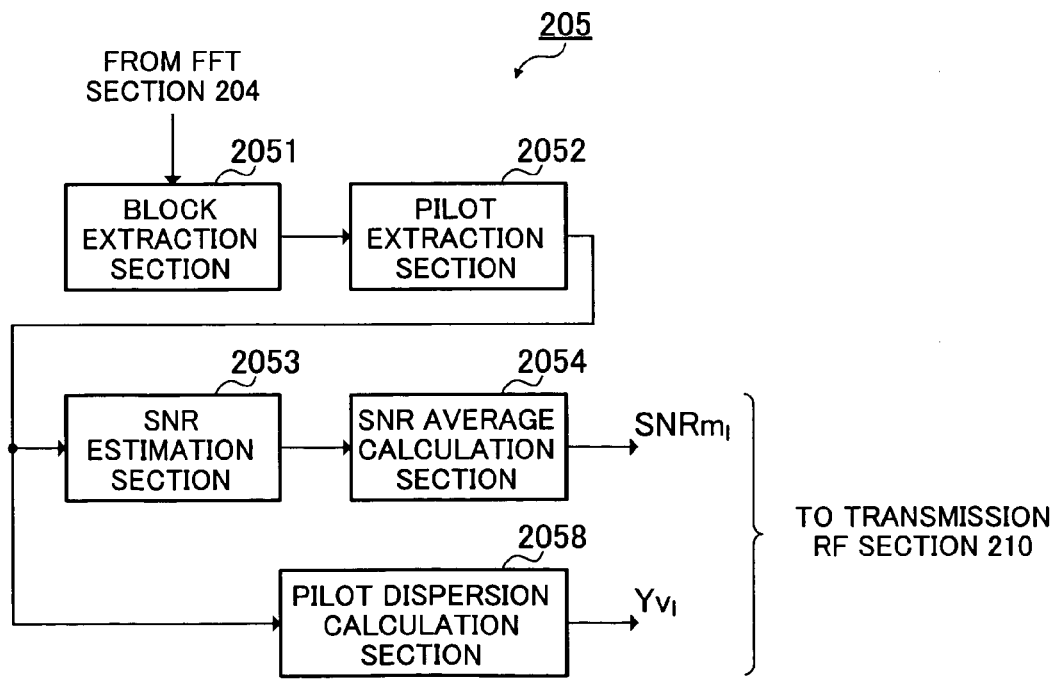
FIG. 7 is a block diagram showing a configuration of a propagation path characteristics estimation section in a wireless reception apparatus according to Embodiment 3 of the present invention.

FIG. 7 is a block diagram showing a configuration of a propagation path characteristics estimation section 205 according to Embodiment 3 of the present invention. In FIG. 7, the same portions as in FIG. 2 (in Embodiment 1) will be assigned the same reference numerals as in FIG. 2 to omit detailed explanations thereof.

A pilot dispersion calculation section 205B calculates pilot dispersion $Yv_1$ per block 1 to L from Equation (7), and outputs $Yv_1$ to the transmission RF section 210, as propagation path characteristics information. Now, $Yv_1$ represents the pilot dispersion of the lth block. Here, Equation (7) is derived, considering that in Equation (1) mentioned above, the denominator is a constant.

$$Yv_l = \frac{1}{SI}\sum_{s=1}^{S}\sum_{i=1}^{I}(y_l(s, i) - Ym_l)^2 \quad (7)$$

$$\text{where, } Ym_l = \frac{1}{SI}\sum_{s=1}^{S}\sum_{i=1}^{I}y_l(s, i)$$

By using this pilot dispersion as a parameter for estimating the variation in the propagation path characteristics in each block, the variation in the propagation path characteristics in each block can be estimated accurately, as with Embodiment 1. Therefore, with this embodiment, the optimal modulation scheme can be accurately selected, when adaptive modulation is performed in the communication system in which block division of subcarriers is carried out.

Also by using the pilot dispersion as a parameter which estimates the variations of the propagation path characteristics in each block, wireless transmission apparatus 100 can select modulation scheme with the same selection method as in Embodiment 1. In selection method 2 as weighted SNR, the same four defined in Embodiment 2 will be defined again in this embodiment. Additionally, although in the above-mentioned examples, the pilot dispersion has been used as a parameter representing the variation in the propagation path characteristics in each block, the following parameters can be obtained by modifying the Equation (7) defining the pilot dispersion. Each of these can be used as a parameter representing the variations of the propagation path characteristics in each block, just as the pilot dispersion.

Average change amount of received signal of pilot portion $$u_l = \frac{1}{SI}\sum_{s=1}^{S}\sum_{i=1}^{I}|y_l(s, i) - Ym_l|$$

Maximum change amount of received signal of pilot portion $$v_l = \max_{\substack{1 \le i \le I \\ 1 \le s \le S}} |y_l(s, i) - Ym_l|$$

Square of maximum change amount of received signal of pilot portion $$x_l = \max_{\substack{1 \le i \le I \\ 1 \le s \le S}} |y_l(s, i) - Ym_l|^2$$

Difference between maximum and minimum of received signal of pilot portion $$z_l = \frac{1}{2}\left|\max_{\substack{1 \le i \le I \\ 1 \le s \le S}} y_l(s, i) - \min_{\substack{1 \le i \le I \\ 1 \le s \le S}} y_l(s, i)\right|$$

Difference between square of maximum and square of minimum of received signal of pilot portion $$d_l = \max_{\substack{1 \le i \le I \\ 1 \le s \le S}} |y_l(s, i)|^2 - \min_{\substack{1 \le i \le I \\ 1 \le s \le S}} |y_l(s, i)|^2$$

Embodiment 4

When adaptive modulation is applied to the communication system in which dividing of subcarriers into blocks is carried out, subcarriers whose instantaneous SNR is lower than or equal to the average SNR, among the subcarriers of each block, mainly causes deterioration of the communication quality in each block. So, in this embodiment, dispersion is determined using only instantaneous SNRs less than or equal to the average SNR, in Embodiments 1 through 3.

Specifically, although with Embodiment 1 dispersion was calculated from Equation (4) using S×I instantaneous SNRs, with this embodiment, SNR dispersion: $SNRv_1{}'$ is calculated from Equation (8) using only $G_S$ instantaneous SNR lower than or equal to the average SNR. Now, $G_S$ indicates the number of instantaneous SNRs having values less than or equal to the average SNR among S×I instantaneous SNRs.

$$SNRv'_l = \frac{1}{G_S} \sum_{\substack{s=1 \\ g_l(s,i)<SNRm_l}}^{S} \sum_{i=1}^{I} (g_l(s,i) - SNRm_l)^2 \quad (8)$$

Similarly, dispersion of channel estimation values: $Hv_1'$ is calculated from Equation (9) using only $G_H$ channel estimation values lower than or equal to $Hm_1$, instead of calculating dispersion of channel estimation values from Equation (6) in the above-mentioned Embodiment 2. Now, $G_H$ indicates the number of channel estimation values falling lower than or equal to the average channel estimation value among S×I channel estimation values.

$$Hv'_l = \frac{1}{G_H} \sum_{\substack{s=1 \\ h_l(s,i)<Hm_l}}^{S} \sum_{i=1}^{I} (h_l(s,i) - Hm_l)^2 \quad (9)$$

Similarly, although with Embodiment 3 pilot dispersion was calculated from equation (7), with this embodiment, pilot dispersion: $Yv_1'$ is calculated from Equation (10) using only $G_Y$ received signals of pilot portions with amplitudes smaller than or equal to $Ym_1$. Now, $G_Y$ indicates the number of received signals of pilot portions less than or equal to the average amplitude among S×I received signals of pilot portions.

$$Yv'_l = \frac{1}{G_Y} \sum_{\substack{s=1 \\ y_l(s,i)<Ym_l}}^{S} \sum_{i=1}^{I} (y_l(s,i) - Ym_l)^2. \quad (10)$$

Thus, according to this embodiment, since the dispersion in propagation path characteristics is obtained using only subcarriers causing deterioration in communication quality of block among all subcarriers in each block, the optimal modulation scheme can be selected more accurately, when adaptive modulation is performed in the communication system in which block division of subcarriers is carried out.

Furthermore, in this embodiment, the following parameters can also be cited in addition to the parameters cited as the parameters indicating the variation of the propagation path characteristic in each block that are capable of being used with dispersions in Embodiments 1 through 3.

Average change amount of instantaneous SNRs below average SNR $$u'_l = \frac{1}{G_S} \sum_{\substack{s=1 \\ g_l(s,i)<SNRm_l}}^{S} \sum_{i=1}^{I} |g_l(s,i) - SNRm_l|$$

Maximum change amount of instantaneous SNRs below average SNR $$v'_l = \max_{\substack{1 \le i \le I \\ 1 \le s \le S \\ g_l(s,i)<SNRm_l}} |g_l(s,i) - SNRm_l|$$

Square of maximum amount of instantaneous SNRs below average SNR $$x'_l = \max_{\substack{1 \le i \le I \\ 1 \le s \le S \\ g_l(s,i)<SNRm_l}} |g_l(s,i) - SNRm_l|^2$$

Difference between maximum and minimum of instantaneous SNRs below average SNR $$z'_l = \frac{1}{2} \left| \max_{\substack{1 \le i \le I \\ 1 \le s \le S \\ g_l(s,i)<SNRm_l}} g_l(s,i) - \min_{\substack{1 \le i \le I \\ 1 \le s \le S \\ g_l(s,i)<SNRm_l}} g_l(s,i) \right|$$

Difference between square of maximum and square of minimum of instantaneous SNRs below average SNR $$d'_l = \max_{\substack{1 \le i \le I \\ 1 \le s \le S \\ g_l(s,i)<SNRm_l}} |g_l(s,i)|^2 - \min_{\substack{1 \le i \le I \\ 1 \le s \le S \\ g_l(s,i)<SNRm_l}} |g_l(s,i)|^2$$

Average change amount of channel estimation values below average value $$u'_l = \frac{1}{G_S} \sum_{\substack{s=1 \\ h_l(s,i)<Hm_l}}^{S} \sum_{i=1}^{I} |h_l(s,i) - Hm_l|$$

Maximum change amount of channel estimation values below average value $$v'_l = \max_{\substack{1 \le i \le I \\ 1 \le s \le S \\ h_l(s,i)<Hm_l}} |h_l(s,i) - Hm_l|$$

Square of maximum amount of channel estimation values below average value $$x'_l = \max_{\substack{1 \le i \le I \\ 1 \le s \le S \\ h_l(s,i)<Hm_l}} |h_l(s,i) - Hm_l|^2$$

Difference between maximum and minimum of channel estimation values below average value $$z'_l = \frac{1}{2}\left|\max_{\substack{1\leq i\leq I\\1\leq s\leq S\\h_l(s,i)<Hm_l}} h_l(s,i) - \min_{\substack{1\leq i\leq I\\1\leq s\leq S\\h_l(s,i)<Hm_l}} h_l(s,i)\right|$$

Difference between square of maximum and square of minimum of channel estimation values below average value $$d'_l = \max_{\substack{1\leq i\leq I\\1\leq s\leq S\\h_l(s,i)<Hm_l}} |h_l(s,i)|^2 - \min_{\substack{1\leq i\leq I\\1\leq s\leq S\\h_l(s,i)<Hm_l}} |h_l(s,i)|^2$$

Average change amount of received signals of pilot portion below average amplitude $$u'_l = \frac{1}{G_S}\sum_{\substack{s=1\\y_l(s,i)<Ym_l}}^{S}\sum_{i=1}^{I}|y_l(s,i) - Ym_l|$$

Maximum change amount of received signals of pilot portion below average amplitude $$v'_l = \max_{\substack{1\leq i\leq I\\1\leq s\leq S\\y_l(s,i)<Ym_l}}|y_l(s,i) - Ym_l|$$

Square of maximum change amount of received signals of pilot portion below average amplitude $$x'_l = \max_{\substack{1\leq i\leq I\\1\leq s\leq S\\y_l(s,i)<Ym_l}}|y_l(s,i) - Ym_l|^2$$

Difference between maximum and minimum of received signals of pilot portion below average amplitude $$z'_l = \frac{1}{2}\left|\max_{\substack{1\leq i\leq I\\1\leq s\leq S\\y_l(s,i)<Ym_l}} y_l(s,i) - \min_{\substack{1\leq i\leq I\\1\leq s\leq S\\y_l(s,i)<Ym_l}} y_l(s,i)\right|$$

Difference between square of maximum and square of minimum of received signals of pilot portion below average amplitude $$d'_l = \max_{\substack{1\leq i\leq I\\1\leq s\leq S\\y_l(s,i)<Ym_l}} |y_l(s,i)|^2 - \min_{\substack{1\leq i\leq I\\1\leq s\leq S\\y_l(s,i)<Ym_l}} |y_l(s,i)|^2$$

The functional blocks used above for explanation of the embodiments are typically implemented as LSI, a type of integrated circuit. These blocks may be each discretely integrated into one chip, or may be part of all integrated into one chip.

Although LSI is mentioned here, the integrated chip may be an IC, System LSI, Super LSI, or Ultra LSI, depending on the degree of integration.

Moreover, the integration may be realized not only as LSI, but also as dedicated circuit or general-purpose processor. Field programmable gate array (FPGA) which is programmable after LSI manufacture, or reconfigurable processor which is reconfigurable its connections and setups of circuit cells inside LSI may be used.

Furthermore, as a result of the development of the semiconductor technology and/or the derived technology, if a new technology of integration replacing LSI technology emerges the functional blocks may be integrated using such new technology. Adaptation of biotechnology etc. and so forth may be a possibility.

As explained above, according to the present invention, in the multi-carrier communication system in which block division of subcarriers and adaptive modulation are performed, the optimal modulation scheme can be accurately selected on a per block basis, and as a result, transmission efficiency can be improved.

This application is based on Japanese Patent Application No. 2003-284509 filed on Jul. 31, 2003, the entire content of which is expressly incorporated by reference herein.

INDUSTRIAL APPLICABILITY

The present invention is suitable for use with mobile station apparatuses and base station apparatuses and so forth used in mobile communications systems.

The invention claimed is:

1. A wireless transmission apparatus that performs adaptive modulation with a multicarrier signal formed with a plurality of blocks, each block including a plurality of subcarrier signals, the wireless transmission apparatus comprising:
   a selection section that selects modulation schemes of the plurality of blocks on a per block basis; and
   a modulation section that modulates the plurality of subcarrier signals in the plurality of blocks using the modulation schemes selected on a per block basis,
   wherein the selection section selects the modulation schemes on a per block basis based on an average and a dispersion of values representing propagation path characteristics of each block.

2. The wireless transmission apparatus according to claim 1, wherein the average of the values representing propagation path characteristics comprises an average of SNRs and the dispersion of said values representing propagation path characteristics comprises a dispersion of said SNRs.

3. The wireless transmission apparatus according to claim 2, wherein the dispersion of the SNRs is determined from SNRs less than or equal to an average SNR.

4. The wireless transmission apparatus according to claim 1, wherein the average of the values representing propagation path characteristics comprises an average of SNRs and the dispersion of the values representing propagation path characteristics comprises a dispersion of channel estimation values.

5. The wireless transmission apparatus according to claim 4, wherein the dispersion of the channel estimation values is determined from channel estimation values less than or equal to an average channel estimation value.

6. The wireless transmission apparatus according to claim 1, wherein the average of the values representing propagation path characteristics comprises an average of SNRs and the dispersion of the values representing propagation path characteristics comprises a dispersion of amplitudes of signals of pilot portions.

7. The wireless transmission apparatus according to claim 6, wherein the dispersion of the amplitudes of the signals of pilot portions is determined from signals of pilot portions having amplitudes less than or equal to an average amplitude.

8. A modulation scheme selection method used in a wireless communication system where adaptive modulation is performed with a multicarrier signal formed with a plurality of blocks, each block including a plurality of subcarrier signals, the method comprising:

a selection step of selecting modulation schemes of the plurality of blocks on a per block basis; and a modulation step of modulating the plurality of subcarrier signals in the plurality of blocks using the modulation schemes selected on a per block basis, wherein the selection step selects the modulation schemes on a per block basis based on an average and a dispersion of values representing propagation path characteristics of each block.

* * * * *